United States Patent [19]
LaPointe et al.

[11] Patent Number: 5,237,486
[45] Date of Patent: Aug. 17, 1993

[54] STRUCTURAL FRAME FOR PORTABLE COMPUTER

[75] Inventors: Brion LaPointe, Sunnyvale; David Northway, Palo Alto; Robert Riccomini, Saratoga; Ken Weber, San Jose; Jeff Wood, Sunnyvale, all of Calif.

[73] Assignee: Apple Computer, Inc., Cupertino, Calif.

[21] Appl. No.: 893,853

[22] Filed: Jun. 5, 1992

[51] Int. Cl.5 .......................... H05K 7/20; H05K 9/00; H05K 7/14; G06F 1/16
[52] U.S. Cl. ................................ 361/681; 361/728; 361/687; 361/684; 361/818
[58] Field of Search ............... 364/708; 361/380, 427, 361/383, 429, 386-389, 390-395, 399, 424; 174/35 R

[56] References Cited

U.S. PATENT DOCUMENTS

| | | | |
|---|---|---|---|
| 4,571,456 | 2/1986 | Paulson et al. | 361/386 X |
| 5,060,114 | 10/1991 | Feinberg et al. | 361/387 |
| 5,118,903 | 6/1992 | Schupp et al. | 361/388 X |

FOREIGN PATENT DOCUMENTS 2307441 11/1976 France .................... 361/387

Primary Examiner—Leo P. Picard
Assistant Examiner—Michael W. Phillips
Attorney, Agent, or Firm—Jonathan B. Penn

[57] ABSTRACT

A metal frame is fabricated from magnesium alloy and all the main components of the computer, including the logic board, the hard disk drive, the keyboard, the upper and lower halves of the computer's case, and the pivoting display screen are all directly attached to the frame. The frame thus offers a method for constructing a personal computer which will have greatly improved shock resistance, integrated electromagnetic isolation, and structural strength, without increasing the weight of the completed computer in any significant fashion. Additionally, by means of a cooling flange fabricated as part of the frame, the central processing unit of the portable computer is thermally connected to the frame, which then acts as a heat-sink for the central processing unit, greatly improving its reliability.

2 Claims, 2 Drawing Sheets

STRUCTURAL FRAME FOR PORTABLE COMPUTER

BACKGROUND OF THE INVENTION

This invention is in the field of computers. In particular, it relates to methods and apparatus for constructing computers.

Portable computers are known. A typical portable computer is comprised of two sections. The first is the display panel. The second is the computer itself, which typically comprises a small case-like structure. The case is usually formed from two separate halves, the upper half having the keyboard mounted thereon and the lower half having the logic board, the hard disk drive and the floppy disk drive mounted therein. The two halves are fastened together in a variety of ways and the display panel is fastened to the case with hinges, which allow the display to be folded down onto the case. When not in use and with its display panel folded down, a portable computer makes a very compact and easily carried unit.

Most of the cases for such computers have been constructed from two pieces of very stiff plastic or composite material. The various components, including the logic board and disk drives, are attached to either the upper or lower half of the case by means of screws or other such fastening means. Electromagnetic Interference ("EMI") protection is incorporated into the case by placing a sheet of shielding material inside both halves of the case or by surrounding the relevant components with a metal structure which isolates them from the environment.

Although these methods for constructing portable computers are acceptable, they leave room for improvement. By mounting most major components on the case itself, the computer is susceptible to either momentary or permanent failure whenever it receives a shock or vibration greater than a relatively low level. The structural stiffness available from a plastic or composite material is also typically less than that from metal. However, the weight and cost penalty for fabricating the entire case from metal is usually too great for a portable computer, except in such specialty markets as the military.

Known attempts to correct these problems include portable computers where the case is formed from die-cast metal upper and lower halves. Although this creates a very strong and durable computer, it weights too much for easy portability and the cost of such a computer is too high. Other manufactures have made various subassemblies from sheet metal but the resulting computer is not noticeably stronger.

A new method for constructing a portable computer, which would improve the structural integrity of the computer without increasing its weight or cost would be very desirable. If that method could also improve EMI protection of the finished computer, that would be even more desirable.

SUMMARY OF THE INVENTION

In a first preferred embodiment of the present invention, a new method for constructing a portable computer is disclosed. A light-weight die-cast magnesium frame with integral heat sinks and EMI protection is used as the computer's structural frame. All major components of the computer, including the hard disk, the logic board, and the keyboard are screwed to the frame. The upper and lower halves of the computer's case are coupled through the frame to the upper and lower halves of the computer's case. A sheet of mylar-coated aluminum is placed under the logic board and disk drive. Along the edge of the sheet, small areas of mylar have been removed. After the computer is assembled, these areas of uninsulated aluminum contact the frame, providing a Faraday cage around all the internal circuitry. Also, the frame has a extended flange which, after the computer is assembled, overlies the computer's central processing unit ("CPU"). The flange is coupled to the CPU by means of a small piece of thermally conductive foam. This enables the flange and the entire frame to act as a heat sink for the CPU. The reduction in CPU operating temperature improves the reliability of the computer as a whole.

The frame thus provides increased structural strength and durability, improved shock resistance for the various components and the computer as a whole, CPU cooling, integrated EMI protection, and ease of construction without any significant weight or cost increases.

The preferred embodiment of the present invention will now be discussed with reference to the figures listed and described below.

BRIEF DESCRIPTION OF THE ILLUSTRATIONS

FIG. 1 is a perspective of a first preferred embodiment of the present invention; and FIG. 2 is an exploded isometric drawing of a portable computer incorporating the present invention.

DETAILED DESCRIPTION OF THE PREFERRED EMBODIMENT

Figure 1:
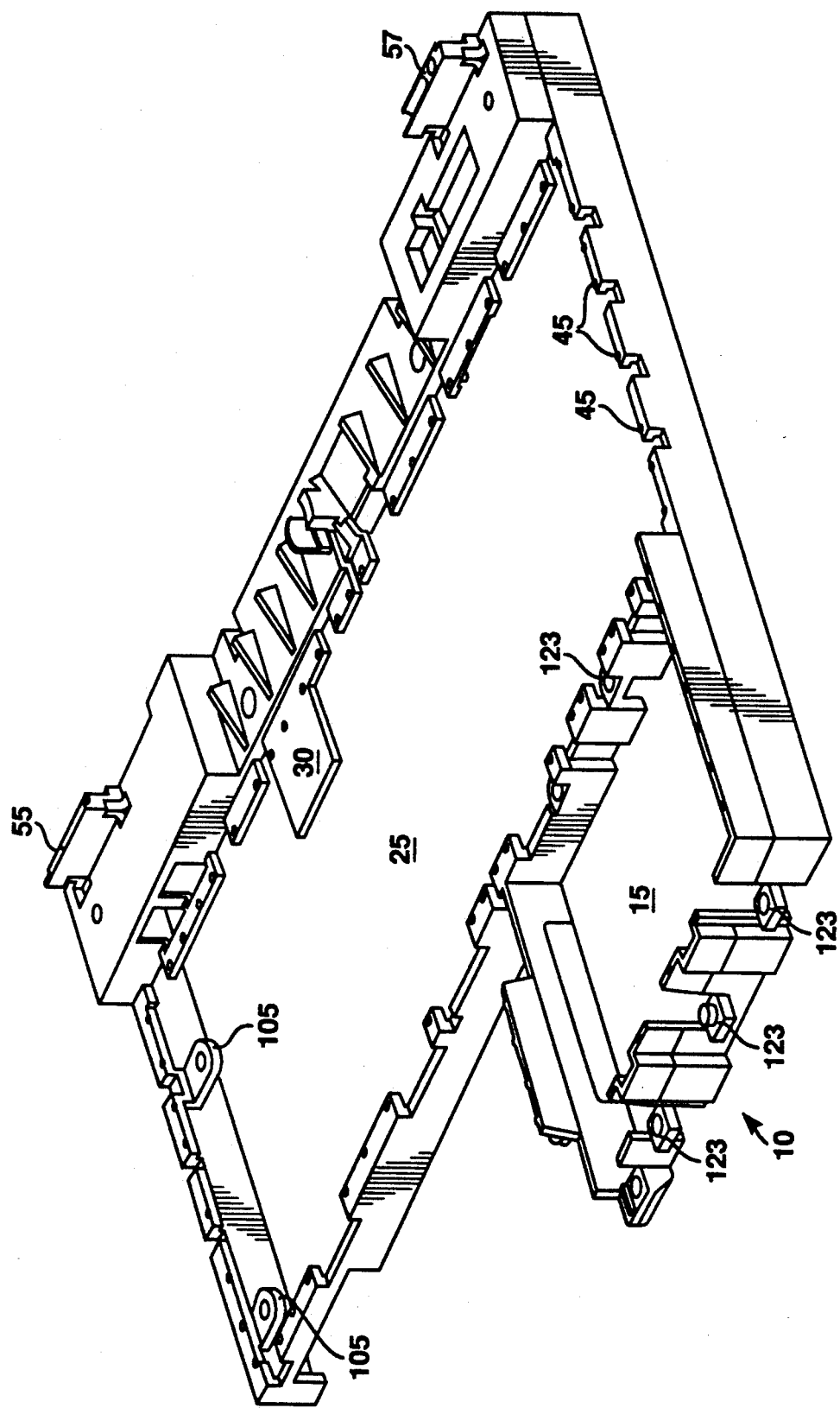

A first preferred embodiment of the present invention is shown in FIG. 1. In this preferred embodiment, frame 10 is comprised of die-cast magnesium alloy. Aluminum and steel were considered, but magnesium's strength-to-weight ratio proved to be the most favorable. For descriptive purposes, frame 10 can be discussed as being comprised of hard disk mounting area 15 and logic board mounting area 25. Extending inwards from frame 10 into logic board mounting area 25 is CPU cooling flange 30. Distributed along the entire perimeter of frame 10 and along its interior sections are a plurality of small projections 45. These projections allow frame 10 to be electrically coupled to an aluminum-mylar sheet 60 (FIG. 2) which, in combination with the frame, provides both EMI shielding and an electrical ground for the computer constructed using frame 10.

Figure 2:
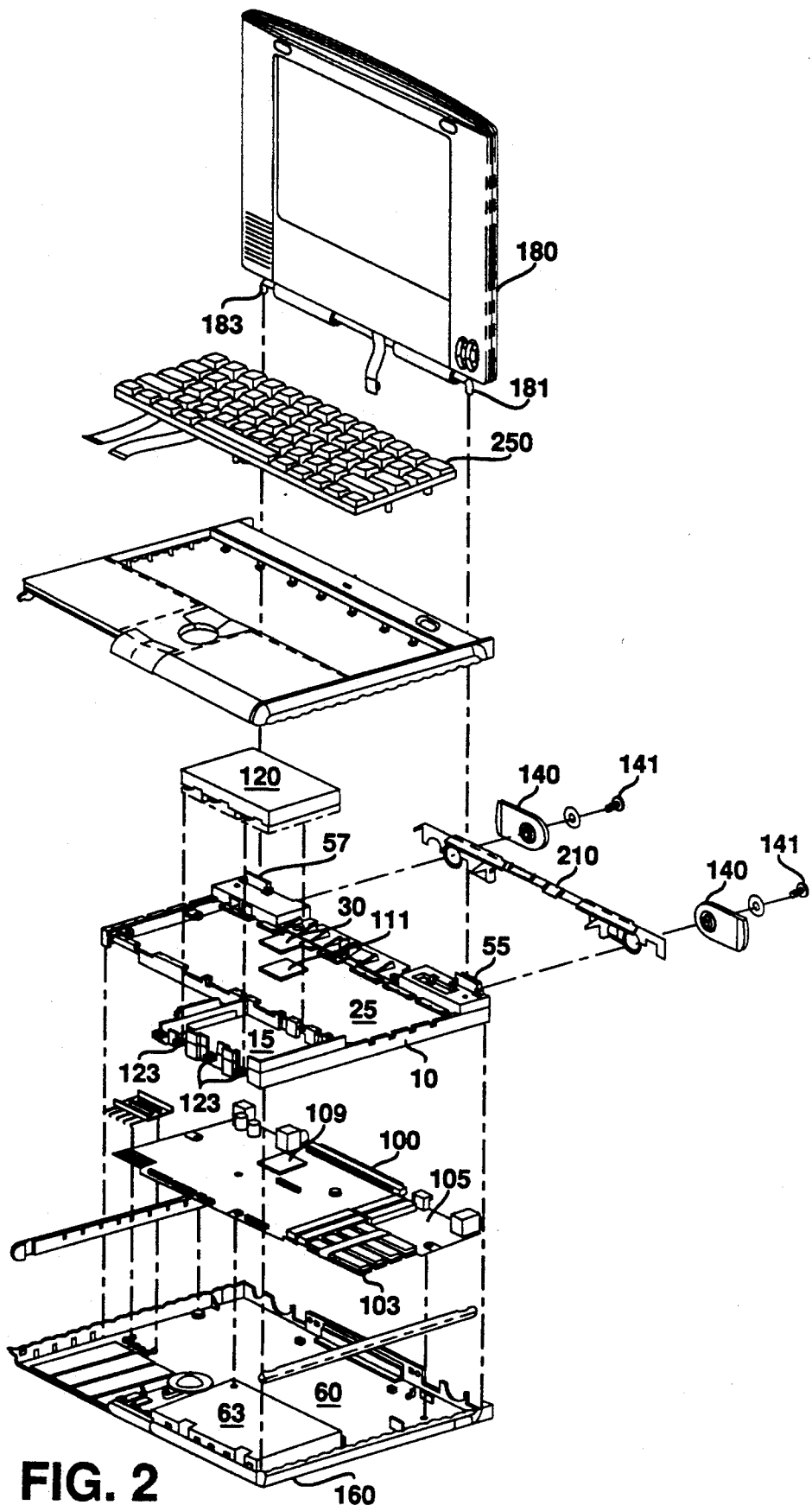

FIG. 2 shows how the various components which comprise the portable computer constructed using the present invention are mountedthrough and to the present invention. Logic board 100 is coupled to frame 10 by means of several mounting screws inserted through flanges 105 which project into area 25. Logic board 100 may have a RAM expansion board 103 and a modem board 105 attached thereto. Once logic board 100 is attached to frame 10, flange 30 extends over CPU 109. A small piece of thermally conductive foam 111 is adhesively attached to the bottom surface of flange 30. After board 100 is coupled to frame 10, conductive foam piece 111 is compressed between CPU 109 and flange 30, allowing heat transfer between the CPU and the frame. The use of the flange/frame cooling apparatus and method described herein allows the CPU to operate at a much lower temperature than would be possible in the absence of such a cooling scheme. This increases computer reliability by a significant amount, as heat failure of the CPU is one of the most common reasons for computer failure.

Hard drive 120 is attached to frame 10 by means of mounting screws inserted through lugs 123 which surround mounting area 15. Given the typical operating environment of a portable computer, this type of mounting for the hard drive greatly improves its reliability during typical operation and also improves its ability to survive those catastrophic accidents, such as being dropped, that portable computers are much more apt to suffer than stationary units.

Flip feet 140 are also attached to frame 10 by means of mounting screws 141 inserted through plastic rear cover 210. This metal-to-metal mounting, albeit through the plastic piece, makes the feet much more durable in normal use.

EMI protection for the entire computer is provided in a highly innovative fashion using frame 10. Aluminum-mylar sheet 60 is placed on the bottom of lower computer case half 160. Although most of sheet 60 is coated with mylar, small areas have been removed in areas where the cleared areas would, upon completion of assembly operations, contact projections 45 in frame 10. During assembly, flap 63 of sheet 60 is folded over the top of hard disk drive area 15. When the two halves of the case are coupled together, the sheet is pressed against the frame. The mylar-free aluminum areas contact the frame, forming a Faraday cage around the logic board (in conjunction with the metal plate which forms the bottom of keyboard assembly 250, which plate is not shown) and isolating the computer circuitry from outside electrical interference and simultaneously preventing the computer from being a source of EMI. The mylar insulation on sheet 60 prevents short circuits from occurring where the bottom of logic board 100 contacts sheet 60. The bottom of keyboard assembly 250 comprises a solid metal sheet which contacts frame 10 along its perimeter.

The portion of a folding computer which receives the greatest wear and tear and which is also susceptible to the highest loads is where folding display 180 is coupled by means of a hinge-like assembly to the computer case.

In this first embodiment, attachment points 55 and 57 receive hinge point 181 and 183 of display 180. As the stresses of opening and closing the display, as well as the sustained load of an open screen are placed directly on metal frame 10 through points 55 and 57, the pivoting joint is much stronger in the present invention than in known portable systems.

The present invention has now been described in the context of a single preferred embodiment. Nothing herein should be taken to limit this invention to the particular embodiment discussed. For example, specific areas of part attachment and the location of disk drive mounting areas could easily be changed without departing from the purpose or spirit of the present invention. Given these alternatives, this invention should not be considered in a narrow, restrictive sense, but rather in a broad, expansive one.

What is claimed is:

1. In a computer including a main circuit board with a central processing unit, a memory storage unit, an electromagnetic shield, upper and lower case halves, a display screen and a metal frame for providing increased structural strength, thermal cooling and electromagnetic shielding, said metal frame comprising:

first area mounting said main circuit board of said computer, the first area having a flange extending therefrom, the flange overlying the area on the main circuit board where said central processing unit is mounted;

second area coupled to the first area and mounting said memory storage unit;

a plurality of small projections extending from the upper and lower surface of the frame along both the first and second areas and contacting said electromagnetic shield;

upper and lower case attachment points attaching said upper and lower case halves to the frame; and display screen attachment points receiving and mounting said display screen so that the display screen can pivot from a closed to open position.

2. The frame of claim 1 wherein the flange is coupled to the central processing unit by means of a thermally conductive foam.

* * * * *